US009217414B2

(12) United States Patent  
Casazza et al.

(10) Patent No.: US 9,217,414 B2  
(45) Date of Patent: Dec. 22, 2015

(54) WIND POWER TURBINE FOR GENERATING ELECTRIC ENERGY

(71) Applicant: WINDFIN B.V., Leimuiden (NL)

(72) Inventors: Matteo Casazza, Val di Vizze (IT); Fabian Oberbichler, Selva dei Molini (IT); Matthias Preindl, Rasun-anterselva (IT)

(73) Assignee: WINDFIN B.V., Leimuiden (NL)

( * ) Notice: Subject to any disclaimer, the term of this patent is extended or adjusted under 35 U.S.C. 154(b) by 0 days.

(21) Appl. No.: 14/366,610

(22) PCT Filed: Dec. 20, 2012

(86) PCT No.: PCT/IB2012/057562  
§ 371 (c)(1),  
(2) Date: Jun. 18, 2014

(87) PCT Pub. No.: WO2013/093855  
PCT Pub. Date: Jun. 27, 2013

(65) Prior Publication Data  
US 2015/0123403 A1    May 7, 2015

(30) Foreign Application Priority Data  
Dec. 20, 2011   (IT) ............................. MI2011A2323

(51) Int. Cl.  
*F03D 7/00*    (2006.01)  
*F03D 7/02*    (2006.01)  
(Continued)

(52) U.S. Cl.  
CPC ............ *F03D 7/0296* (2013.01); *F03D 7/0224* (2013.01); *F03D 7/044* (2013.01);  
(Continued)

(58) Field of Classification Search  
CPC ......................................................... F03D 7/00  
USPC .............................................................. 240/44  
See application file for complete search history.

(56) References Cited

U.S. PATENT DOCUMENTS 4,292,532 A * 9/1981 Leroux .............................. 290/6  
8,410,623 B2   4/2013 Stockner  
(Continued)

FOREIGN PATENT DOCUMENTS

DE    196 52 673    6/1998  
DE    102 33 589    11/2003  
(Continued)

OTHER PUBLICATIONS

International Search Report and Written Opinion for International Application No. PCT/IB2012/057562 dated Jul. 5, 2013.  
(Continued)

*Primary Examiner* — Joseph Waks  
(74) *Attorney, Agent, or Firm* — Neal, Gerber & Eisenberg LLP

(57) ABSTRACT

A wind power turbine configured to generate electric energy has: a supporting structure; a nacelle; a blade assembly which rotates with respect to the nacelle; a first and second electric machine having, respectively, a substantially coaxial first and second stator, and a first and second rotor coupled to the first and second stator to rotate about a first and second axis; a transmission configured to connect the first rotor to the second rotor; a control device configured to control the wind power turbine; and a detection system connected to the control device to detect relative movement between the first rotor and the second rotor.

20 Claims, 3 Drawing Sheets

(51) Int. Cl.
*F03D 9/00* (2006.01)
*H02K 7/00* (2006.01)
*H02K 7/18* (2006.01)
*H02K 11/00* (2006.01)
*H02K 16/00* (2006.01)
*F03D 7/04* (2006.01)
*F03D 11/00* (2006.01)
*F03D 11/02* (2006.01)

(52) U.S. Cl.
CPC ........... *F03D 9/002* (2013.01); *F03D 11/0091* (2013.01); *F03D 11/028* (2013.01); *H02K 7/003* (2013.01); *H02K 7/1838* (2013.01); *H02K 11/0026* (2013.01); *H02K 16/00* (2013.01); *Y02E 10/725* (2013.01); *Y02E 10/726* (2013.01)

(56) References Cited

U.S. PATENT DOCUMENTS

| | | | | |
|---|---|---|---|---|
| 8,618,689 | B2 * | 12/2013 | Casazza | 290/55 |
| 2005/0280264 | A1 * | 12/2005 | Nagy | 290/55 |
| 2008/0265585 | A1 * | 10/2008 | Torres Martinez | 290/55 |
| 2010/0026010 | A1 | 2/2010 | Pabst | |
| 2011/0285137 | A1 * | 11/2011 | Casazza | 290/55 |
| 2013/0127165 | A1 | 5/2013 | Vihriälä | |

FOREIGN PATENT DOCUMENTS

| | | | |
|---|---|---|---|
| EP | 1589222 A2 * | 10/2005 | |
| EP | 1 988 282 | 11/2008 | |
| EP | 2 333 323 | 6/2011 | |
| ES | 2 140 301 | 2/2000 | |
| GB | 2 036 881 | 7/1980 | |
| JP | 2010007527 A * | 1/2010 | |
| JP | 2012002074 A * | 1/2012 | |
| WO | WO 2008/078342 | 7/2008 | |

OTHER PUBLICATIONS

Notification Concerning Submission, Obtention or Transmittal of Priority Document (Form PCT/IB/304) for International Application No. PCT/IB2012/057562 dated Apr. 11, 2013.

Letter to International Bureau of WIPO for International Application No. PCT/IB2012/057562 dated Jun. 10, 2014.

* cited by examiner

WIND POWER TURBINE FOR GENERATING ELECTRIC ENERGY

PRIORITY CLAIM

This application is a national stage application of PCT/IB2012/057562, filed on Dec. 20, 2012, which claims the benefit of and priority to Italian Patent Application No. MI2011A 002323, filed on Dec. 20, 2011, the entire contents of which are each incorporated by reference herein.

BACKGROUND

One known wind turbine is described in PCT Patent Application No. WO 2008/078342 and the embodiments shown in FIGS. 1, 4, 5, 6, 9, 11, 12, 13, 16 and 17, in which the wind turbine comprises at least two electric machines on opposite sides of the supporting structure.

Certain known wind turbines have drawbacks in terms of dependability, because of their complex structural design, and especially the presence of two rotors connected by the transmission. Because the transmission normally has to permit reversible connection, trade-offs are sometimes necessary in terms of rigidity. Moreover, given the dimensions, particularly the axial dimensions, involved, movements caused by rotation, by uneven stress, and by imperfect balancing of the blade assembly are transmitted and amplified by the structure. The dependability and working life of the wind turbine may be affected by severe or prolonged stress (sudden collapse, fatigue failure, etc.).

Some controllable operating quantities affect the stress state of the rotor-transmission assembly. For example, the instantaneous resisting torque necessary to oppose rotation, average rotation speed, and the attack angle of the blades induce different stresses, and could be controlled to attenuate or absorb stress and movements of the rotor-transmission assembly.

Normally available parameters recorded to regulate the wind turbine do not allow for accurately determining the wind turbine's stress state, which means any steps taken to reduce mechanical stress on the rotating parts are substantially ineffective.

SUMMARY

The present disclosure relates to a wind power turbine configured to generate electric energy.

More specifically, the present disclosure relates to a wind power turbine configured to generate electric energy, and comprising:
 a supporting structure;
 a nacelle;
 a blade assembly which rotates with respect to the nacelle;
 a first and second electric machine comprising, respectively, a substantially coaxial first and second stator, and a first and second rotor coupled to the first and second stator to rotate about a first and second axis;
 a transmission configured to connect the first rotor to the second rotor; and
 a control device configured to control the wind power turbine.

It is an advantage of the present disclosure to provide a wind power turbine configured to generate electric energy, configured to limit certain of the drawbacks of certain of the known art.

According to the present disclosure, there is provided a wind power turbine configured to generate electric energy, comprising:
 a supporting structure;
 a nacelle;
 a blade assembly which rotates with respect to the nacelle;
 a first and second electric machine comprising, respectively, a substantially coaxial first and second stator, and a first and second rotor coupled to the first and second stator to rotate about a first and second axis;
 a transmission configured to connect the first rotor to the second rotor;
 a control device configured to control the wind power turbine; and
 a detection system connected to the control device to detect relative movement between the first rotor and the second rotor.

Relative movement between the first and second rotor indicates the strain and stress to which the rotating parts of the turbine are subjected. In the present disclosure, the detection system determines relative movement between the first and second rotor, and so supplies the control device with a reliable parameter by which to take steps to reduce stress, internal stress and strain, and so improve the operating conditions of the turbine.

It is a further advantage of the present disclosure to provide a method of controlling a wind turbine configured to generate electric energy.

According to the present disclosure, there is provided a method of controlling a wind power turbine configured to generate electric energy, the wind power turbine comprising a supporting structure; a nacelle; a blade assembly which rotates with respect to the nacelle; and a first and second electric machine comprising, respectively, a substantially coaxial first and second stator, and a first and second rotor coupled to the first and second stator to rotate about a first and second axis; the wind power turbine comprising a transmission configured to connect the first rotor to the second rotor; and the method comprising the step of detecting relative movement between the first rotor and the second rotor.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which.

DETAILED DESCRIPTION

Figure 1:
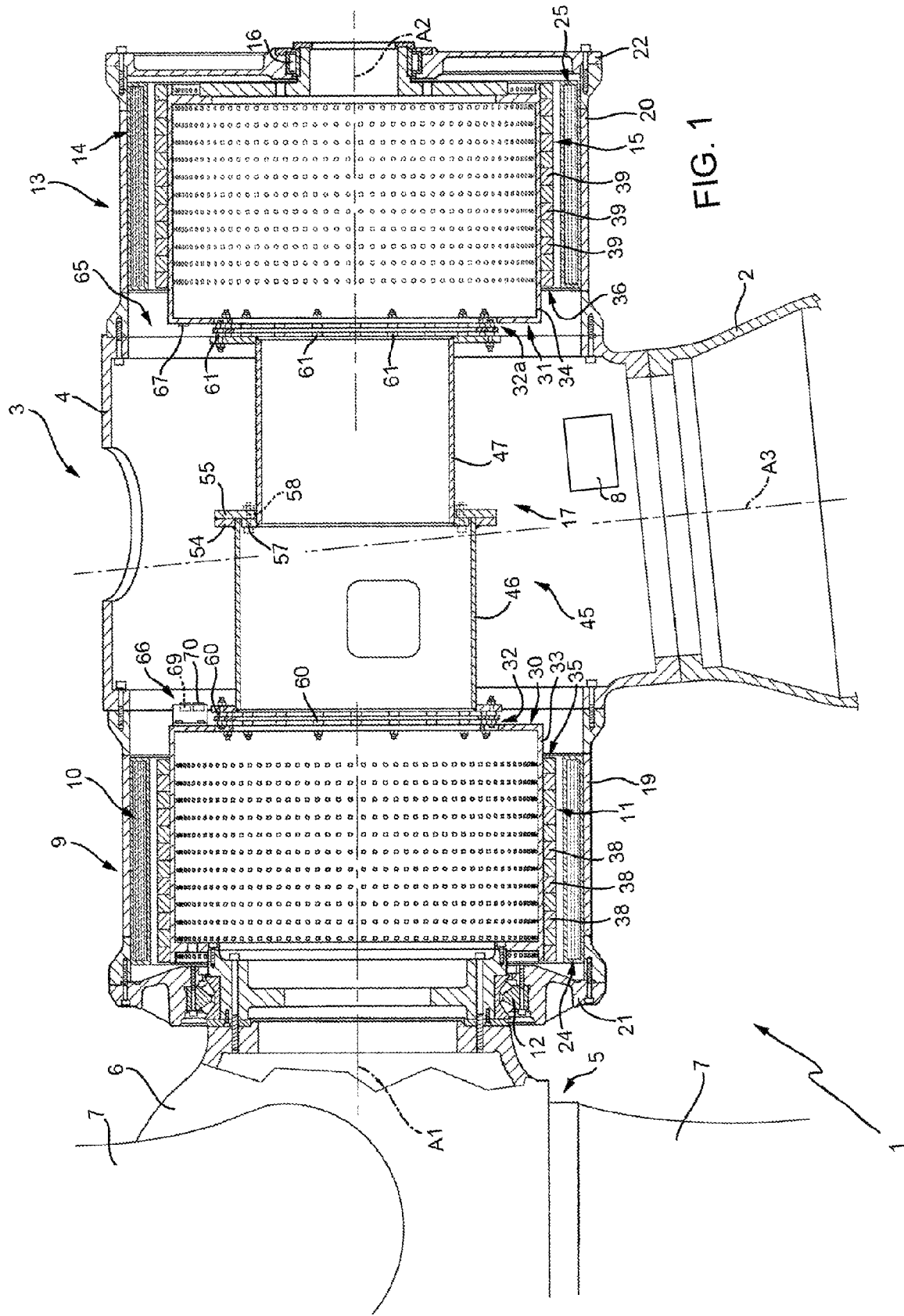
FIG. 1 shows a large-scale, partly sectioned side view, with parts removed for clarity, of a wind power turbine in accordance with one embodiment of the present disclosure.

Referring now to the example embodiments of the present disclosure illustrated in FIGS. 1 to 5, number 1 in FIG. 1 indicates a wind turbine—in the example shown, a direct-drive, variable-angular-speed wind turbine—for generating electric energy.

Wind turbine 1 comprises a supporting structure 2; a nacelle 3 comprising an annular central member 4 fitted for rotation to supporting structure 2; a blade assembly 5 comprising a hub 6 fitted to nacelle 3 to rotate about an axis A1, and a quantity or number of blades 7 fitted to hub 6 and adjustable about respective axes (not shown); and a control device 8 configured to control wind turbine 1.

In the example shown in the attached drawings, axis A1 is substantially horizontal.

Wind turbine 1 comprises an electric machine 9 having an annular stator 10 and an annular rotor 11, which is coupled to stator 10 magnetically and mechanically to rotate about axis A1 on a bearing assembly 12. In other words, electric machine 9 is an annular electric generator.

Wind turbine 1 comprises an electric machine 13 having an annular stator 14 and an annular rotor 15, which is coupled to stator 14 magnetically and mechanically to rotate about an axis A2 on a bearing assembly 16. In other words, electric machine 13 is an annular electric generator. Axes A1 and A2 are coincident when wind turbine 1 is at rest or undergoing no strain.

Stators 10 and 14 are substantially coaxial (i.e., have respective substantially coincident axes of symmetry), and are spaced apart and connected by central member 4. In the example shown, central member 4 is interposed between stators 10 and 14. Stators 10 and 14 are cylindrical and comprise respective hollow stator drums 19 and 20.

Rotors 11 and 15 are connected by a transmission 17, which transfers rotation from rotor 11 to rotor 15, as shown in FIG. 1.

Hub 6 is fixed directly to rotor 11 to transfer wind-induced rotation to rotor 11.

Central member 4 is fixed to supporting structure 2 to rotate about an axis A3, to position blade assembly 5 into the wind.

Nacelle 3 comprises two annular collars 21 and 22 positioned contacting respective stator drums 19 and 20, and which define the opposite ends of nacelle 3. In other words, collars 21 and 22 are located on opposite sides of axis A3.

Stator drums 19 and 20, central member 4, and annular collars 21 and 22 define the supporting structure of nacelle 3.

With reference to FIG. 1, blade assembly 5, rotor 11, transmission 17, and rotor 15 define a rotary assembly housed partly inside nacelle 3. In the example shown, rotor 11, transmission 17, and rotor 15 are housed inside nacelle 3 and supported solely by bearing assemblies 12 and 16 at opposite ends of nacelle 3. Bearing assembly 12 is located where rotor 11 connects to hub 6; and bearing assembly 16 is located at the free end of nacelle 3, at annular collar 22.

Each stator 10, 14 comprises a quantity or number of stator segments 24, 25 extending axially and equally spaced about respective stator drum 19, 20. Stator segments 24, 25 are fixed along the inner face of respective stator drum 19, 20.

Each rotor 11, 15 is hollow, and comprises a hollow cylindrical rotor drum 33, 34 of such an inside diameter as to enable worker access inside for maintenance or inspection.

Each rotor 11, 15 comprises a quantity or number of rotor segments 35, 36 extending parallel to and equally spaced about respective axis A1, A2. Each rotor segment 35, 36 comprises a gripper (not shown in the drawings) fixed to the outer wall of respective rotor drum 33, 34; and a quantity or number of magnetized modules 38, 39, in particular permanent magnets, fixed by the relative gripper to respective rotor drum 33, 34. Each rotor segment 35, 36 is withdrawable parallel to respective axis A1, A2.

Rotor drums 33 and 34 have respective annular lateral surfaces 30 and 31, one for each rotor drum 33 and 34, facing each other and adjacent to transmission 17.

In the example shown, electric machines 9 and 13 are synchronous, though the present disclosure also applies to any type of rotating electric machine (e.g., asynchronous electric generators with a squirrel-cage rotor, or synchronous electric generators with a rotor with rotor windings instead of permanent magnets).

With reference to FIG. 1, transmission 17 comprises a telescopic propeller shaft 45 comprising: a hollow cylinder 46 with a first diameter and connected to rotor 11; a hollow cylinder 47 with a second diameter and connected to rotor 15 and to hollow cylinder 46; an outer end flange 54 connected to hollow cylinder 46; an outer end flange 55 welded to outer flange 54; and an outer flange 57 connected rigidly to hollow cylinder 47, connected slidably to hollow cylinder 46, and fixable to outer flange 55 by fasteners 58 (e.g., screws, shown by the dash lines in FIG. 1). The second diameter is sized to enable hollow cylinder 46 to slide axially with respect to hollow cylinder 47 when fasteners 58 are released.

Propeller shaft 45 is connected directly to rotor drum 33 by fasteners 60. More specifically, hollow cylinder 46 is fixed by fasteners 60 to an inner end 32 of lateral surface 30 of rotor drum 33. Propeller shaft 45 is connected directly to rotor drum 34 by fasteners 61. More specifically, hollow cylinder 47 is fixed by fasteners 61 to an inner end 32a of lateral surface 31 of rotor drum 34.

Rotor drum 33 is connected directly to blade assembly 5, which, because of wind stress, may move rotor drum 33 with respect to stator drum 19.

Blade assembly 5 is subject to stress for any of various reasons. For example, as blades 7 sweep close to supporting structure 2, this produces turbulence, resulting in asymmetric stress on blade assembly 5. Other stresses capable of producing relative movements between electric machines 9 and 13 or parts of them, are gusts of wind on blades 7 or nacelle 3, or actual rotation of blade assembly 5.

In a variation of the present disclosure, propeller shaft 45 comprises an elastic joint (not shown in the drawings) located between hollow cylinder 46 and rotor drum 33 and/or between hollow cylinder 47 and rotor drum 34, and which comprises elastic blocks (not shown in the drawings) of elastomer material such as rubber or adiprene.

In another embodiment of the present disclosure, the elastic joint (not shown in the drawings) comprises a quantity or number of elastically deformable metal plates.

In another embodiment (not shown) of the present disclosure, the transmission comprises an annular elastic joint having two annular plates and a ring of elastomer material such as rubber or adiprene.

With reference to the attached drawings, axes A1 and A2 are coincident in the absence of deformation. It is understood, however, that, in actual use, axes A1 and A2 may assume non-coincident positions.

Figure 2:
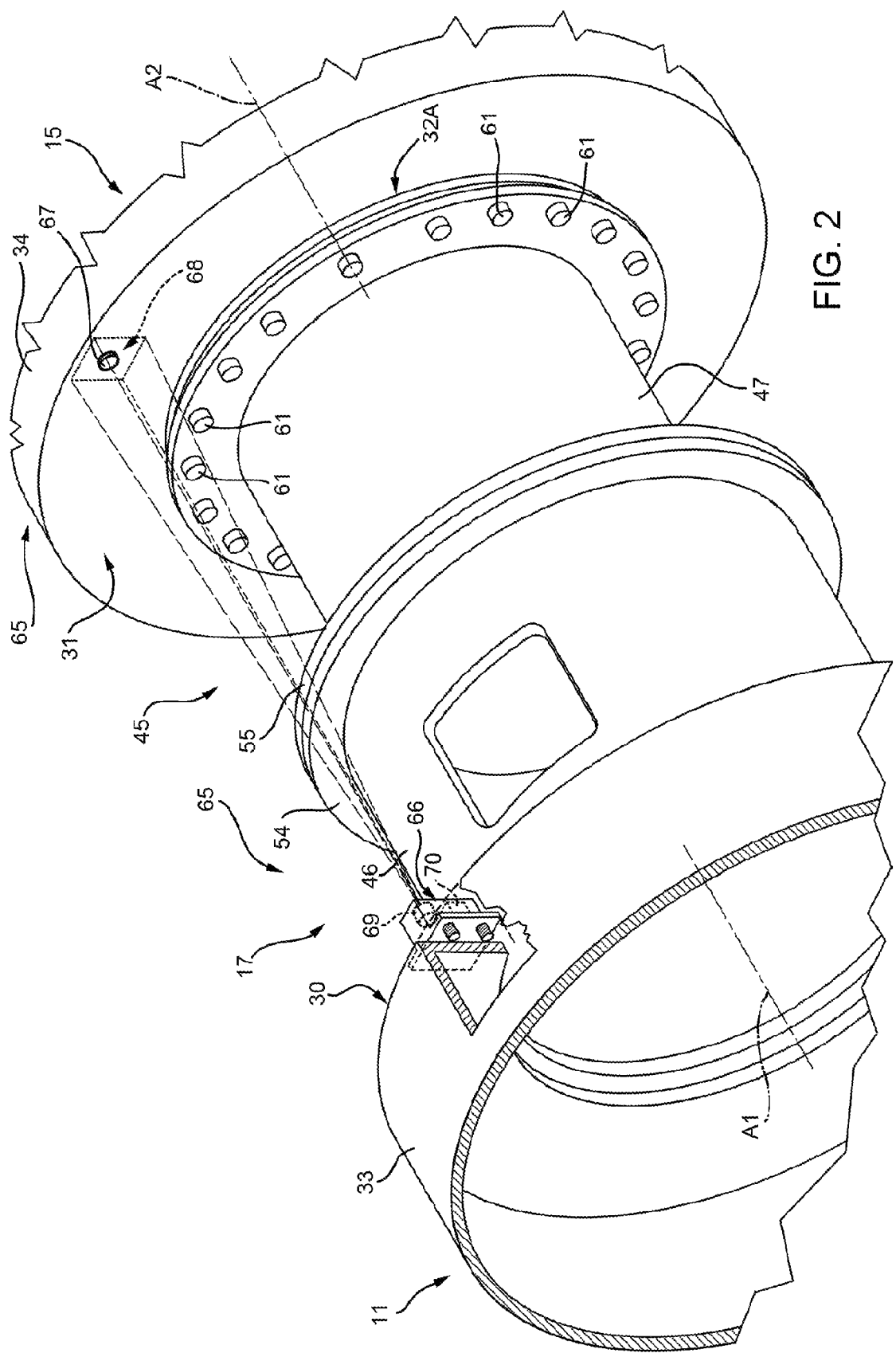
FIG. 2 shows a large-scale, partly sectioned view in perspective, with parts removed for clarity, of a wind power turbine in accordance with the FIG. 1 embodiment.
Figure 3:
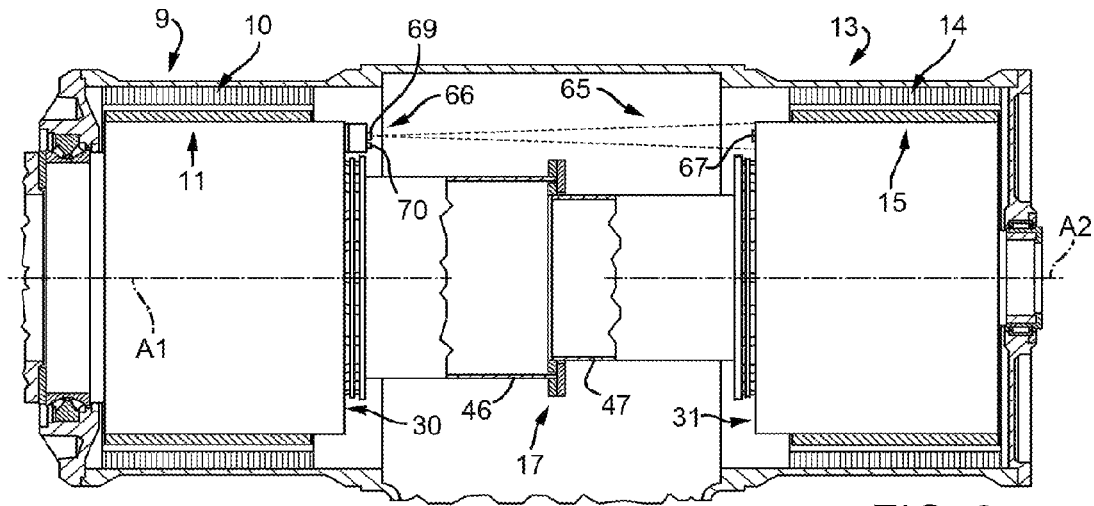
FIG. 3 shows a schematic of a wind power turbine in accordance with the FIGS. 1 and 2 embodiment.

With reference to FIGS. 1, 2 and 3, wind turbine 1 comprises a detection system 65 connected to control device 8 and configured to detect relative movement between rotor 11 and rotor 15.

Detection system 65 comprises an optoelectronic detecting device 66 fitted rigidly to electric machine 9; and a marker 67, which, in the embodiment shown, is a reflector. More specifically, optoelectronic detecting device 66 is located on lateral surface 30 of rotor 11 and faces lateral surface 31 of rotor 15.

Marker 67 is an optical contrast member located on lateral surface 31 of electric machine 13 and facing detecting device 66. In the embodiment described herein, marker 67 is a reflector, such as a reflector body. In alternative embodiments, the marker may be a body with a reflecting metal surface, a spot of reflecting paint or at any rate of contrasting colour to lateral surface 31 of rotor 15, or a hole.

Detecting device 66 comprises an image sensor 69 configured to take images of an acquisition area 68 (shown by the dotted line in FIG. 2) on lateral surface 31 of rotor 15. Whereas the position of marker 67 on lateral surface 31 is fixed, the position of acquisition area 68 varies, depending on the movement of rotor 11 with respect to rotor 15. That is, acquisition area 68 is defined by image sensor 69, which is fixed to lateral surface 30 but not rigidly connected to lateral surface 31. So the acquisition area 68 framed by image sensor 69 may vary in the event of deformation of the structure.

Rotors 11 and 15 are rotated by the wind at the same mean angular speed, and are subject to varying forces caused by blade assembly 5, the control action of control device 8, and wind action in general. And the stresses produce relative movement and oscillation between rotor 11 and rotor 15 as they rotate.

Acquisition area 68 is defined so that marker 67 is always located within acquisition area, albeit in different positions due to the relative movement and oscillation between rotor 11 and rotor 15.

Detection system 65 comprises a lighting device 70, which may be an incandescent lamp, a LED or a laser, such as with peak emission in the red band, or an infrared lamp. Lighting device 70 is located on rotor 11, in particular on lateral surface 30, and positioned facing lateral surface 31 to illuminate acquisition area 68.

In an alternative embodiment (not shown in the drawings), lighting device 70 is located on central member 4 of nacelle 3, and the light beam is directed to illuminate acquisition area 68.

Figure 4:
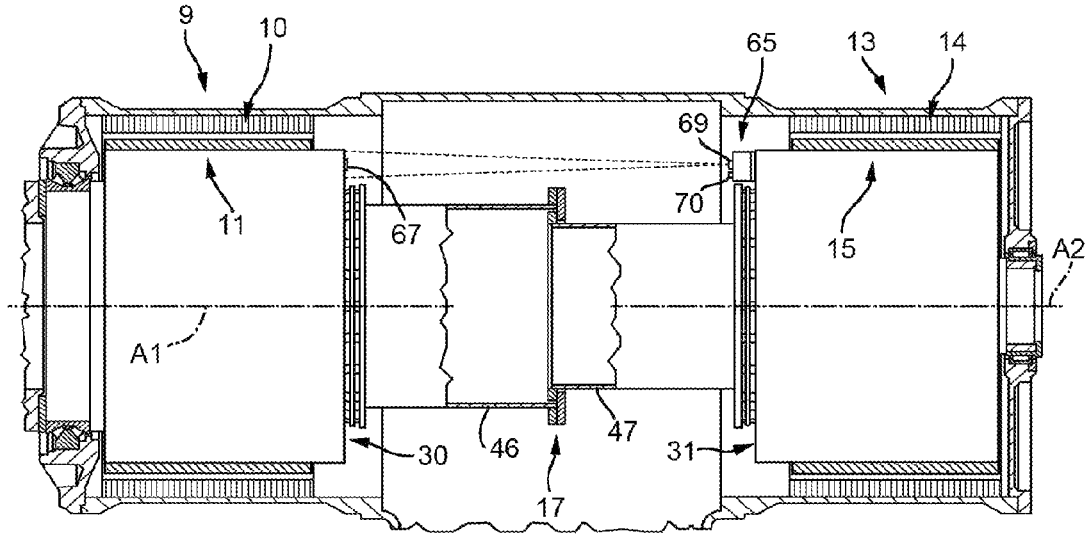
FIG. 4 shows a schematic of a wind power turbine in accordance with an alternative embodiment of the present disclosure.

In another alternative embodiment in FIG. 4, detecting device 66 is located on rotor 15, in particular on lateral surface 31, and marker 67 is located on rotor 11, in particular on lateral surface 30, so acquisition area 68 is defined on lateral surface 30.

Figure 5:
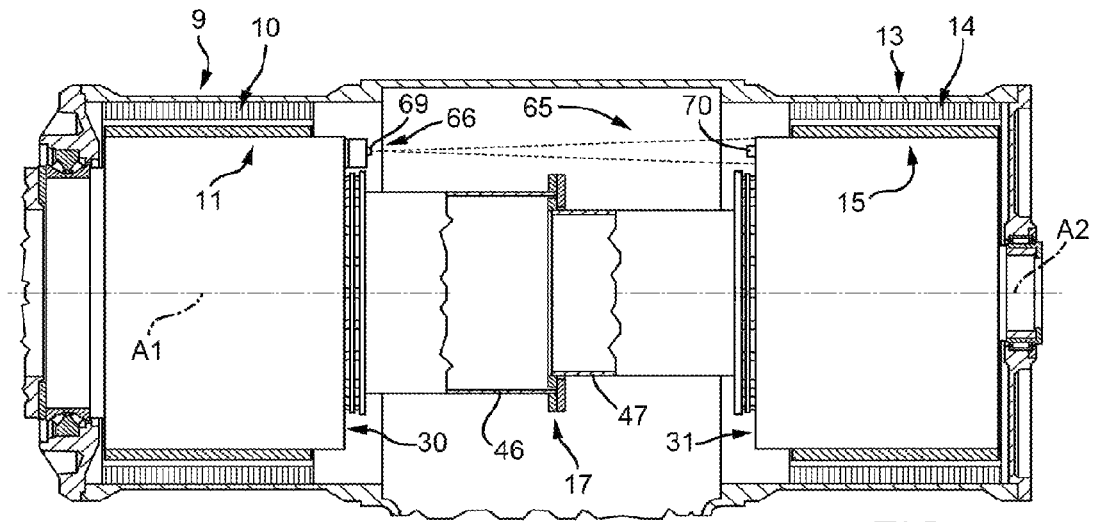
FIG. 5 shows a schematic of a wind power turbine in accordance with another alternative embodiment of the present disclosure.

In another alternative embodiment in FIG. 5, lighting device 70 is located on lateral surface 31, within acquisition area 68, and is used as a marker.

Detection system 65 comprises a central unit, which receives and processes the image of acquisition area 68 from sensor 66 to determine the current position of marker 67 within acquisition area 68 (e.g., with respect to two non-coincident reference axes). By appropriately configuring the reference axes (i.e., one vertical and the other horizontal), the torsion and shear forces on rotor 11, rotor 15, and transmission 17 are determined by projecting the relative movements on the two reference axes.

The current position of marker 67 is sent to control device 8, which determines the relative movement between rotor 11 and rotor 15 on the basis of the difference between the current position of marker 67 and a reference position, (e.g., the centre of acquisition area 68). A quantity indicating the relative movement between rotor 11 and rotor 15 is recorded.

Control device 8 processes the various relative movement recordings to determine the amplitude and/or frequency of any oscillation between rotor 11, rotor 15 and transmission 17.

In an alternative embodiment, control device 8 processes the various relative movements by fast Fourier transform (FFT) to determine the amplitude and frequency of any relative oscillation between rotor 11, rotor 15, and transmission 17.

Control device 8 also controls wind turbine 1 on the basis of the current relative movement and various recorded relative movements, to prevent or attenuate stress and deformation on rotor 11, rotor 15 and transmission 17.

More specifically, the control device may adjust the blade attack angle and/or the resisting torque of electric machine 9 and/or electric machine 13, to reduce the effects of forces acting unevenly on the structure and resulting in periodic stress and oscillation (e.g., the blades may be stressed unevenly or not be perfectly balanced; within an angle, the tower may interfere with the action of the wind on the passing blades).

Control device 8 also determines the wear status or permanent deformation of the wind turbine 1 structure. In other words, in the event of permanent relative movements between rotors 11 and 15 and at various speeds, control device 8 determines a malfunction and issues a warning calling for maintenance of wind turbine 1.

By detecting relative movements between rotors 11 and 15, wind turbine 1 can be controlled more effectively, to reduce the causes of breakdowns and failures, and also ensure timely maintenance work.

Detection system 65 described is accurate and fast, such that control device 8 is provided with reliable information with which to work effectively.

Clearly, changes may be made to the wind turbine and method as described herein without, however, departing from the scope of the attached Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electric energy generating wind power turbine comprising:
    a supporting structure;
    a nacelle;
    a blade assembly configured to rotate with respect to the nacelle;
    a first electric machine including:
        a first stator, and
        a first rotor coupled to the first stator and configured to rotate about a first axis;
    a second electric machine including:
        a second stator substantially coaxial with the first stator, and
        a second rotor coupled to the second stator and configured to rotate about a second axis;
    a transmission configured to connect the first rotor to the second rotor;
    a control device; and
    a detection system connected to the control device and configured to detect a relative movement between the first rotor and the second rotor.

2. The electric energy generating wind power turbine of claim 1, wherein the detection system is located partly on the first rotor and partly on the second rotor.

3. The electric energy generating wind power turbine of claim 1, wherein the detection system includes a sensor located on the first electric machine.

4. The electric energy generating wind power turbine of claim 3, wherein the sensor is optoelectronic.

5. The electric energy generating wind power turbine of claim 3, wherein the sensor includes an image sensor facing the second electric machine to frame an acquisition area on the second electric machine.

6. The electric energy generating wind power turbine of claim 5, wherein the detection system includes a marker located on the second electric machine, said marker is located in a reference position within the acquisition area when the first electric machine and the second electric machine are in a reference configuration.

7. The electric energy generating wind power turbine of claim 6, which includes a lighting device configured to light the acquisition area.

8. The electric energy generating wind power turbine of claim 7, wherein the lighting device is selected from the group consisting of:
at least one incandescent lamp, at least one fluorescent lamp, at least one halogen lamp, at least one infrared lamp, at least one LED, and at least one laser.

9. The electric energy generating wind power turbine of claim 6, wherein:
the first electric machine and the second electric machine are located on opposite sides of the transmission;
the first rotor includes a first lateral surface;
the second rotor includes a second lateral surface facing the first lateral surface;
the sensor is fixed to the first lateral surface;
the marker is fixed to the second lateral surface; and
the acquisition area is defined on the second lateral surface.

10. The electric energy generating wind power turbine of claim 3, wherein the detection system includes a central unit connected to the sensor to determine the relative movement between the first rotor and the second rotor based on at least one sensed image.

11. The electric energy generating wind power turbine of claim 10, wherein the central unit is configured to determine the relative movement between the first rotor and the second rotor in two non-aligned directions.

12. The electric energy generating wind power turbine of claim 11, wherein the two non-aligned directions are perpendicular.

13. The electric energy generating wind power turbine of claim 11, wherein the control device processes the relative movements in the two non-aligned directions using a fast Fourier transform.

14. The electric energy generating wind power turbine of claim 1, wherein:
the control device determines an amplitude of oscillation between the first rotor and the second rotor based on the relative movement between the first rotor and the second rotor, and
the control device controls the wind power turbine to reduce said oscillations.

15. The electric energy generating wind power turbine of claim 1, wherein the transmission includes a propeller shaft including a first hollow cylinder of a first diameter and a second hollow cylinder of a second diameter, said second hollow cylinder being connected reversibly to the first hollow cylinder by a plurality of fasteners and coaxial with the first hollow cylinder to enable relative axial slide of the first hollow cylinder with respect to the second hollow cylinder when the plurality of fasteners are released.

16. A method of controlling an electric energy generating wind power turbine including a supporting structure, a nacelle, a blade assembly configured to rotate with respect to the nacelle, a first electric machine including a first stator and a first rotor coupled to the first stator and configured to rotate about a first axis, a second electric machine including a second stator substantially coaxial with the first stator and a second rotor coupled to the second stator and configured to rotate about a second axis, and a transmission configured to connect the first rotor to the second rotor, said method comprising:
detecting a relative movement between the first rotor and the second rotor; and
controlling the electric energy generating wind power turbine based on the detected relative movement.

17. The method of claim 16, wherein detecting the relative movement between the first rotor and the second rotor includes:
placing a reference element on the second rotor;
acquiring an image of an acquisition area of the second rotor;
determining a position of the reference element with respect to the acquisition area based on the acquired image; and
determining the relative movement between the first rotor and second rotor based on the determined position of the reference element with respect to the acquisition area.

18. The method of claim 17, wherein placing the reference element on the second rotor includes applying a marker on a lateral surface of the second rotor.

19. The method of claim 16, which includes calculating an amplitude of oscillation between the first rotor and the second rotor based on the relative movement between the first rotor and the second rotor.

20. The method of claim 19, wherein the amplitude of oscillation is calculated using a fast Fourier transform.

* * * * *